US012350640B2

(12) United States Patent
Dits et al.

(10) Patent No.: US 12,350,640 B2
(45) Date of Patent: *Jul. 8, 2025

(54) APPARATUS FOR PRODUCING PRILLS

(71) Applicants: MACHINEFABRIEK KREBER B.V., Vlaardingen (NL); Stamicarbon B.V., Sittard (NL)

(72) Inventors: Paulus Johannes Nicolaas Dits, Oosterhout (NL); Marcus Wilhelmus Maria Groenewegen, Rotterdam (NL)

(73) Assignees: STAMICARBON B.V, Sittard (NL); MACHINEFABRIEK KREBER B.V., Vlaardingen (NL)

( * ) Notice: Subject to any disclaimer, the term of this patent is extended or adjusted under 35 U.S.C. 154(b) by 35 days.

This patent is subject to a terminal disclaimer.

(21) Appl. No.: 17/797,323

(22) PCT Filed: Feb. 5, 2021

(86) PCT No.: PCT/NL2021/050078
§ 371 (c)(1),
(2) Date: Aug. 3, 2022

(87) PCT Pub. No.: WO2021/158113
PCT Pub. Date: Aug. 12, 2021

(65) Prior Publication Data
US 2023/0051154 A1     Feb. 16, 2023

(30) Foreign Application Priority Data
Feb. 5, 2020   (NL) ...................................... 2024843

(51) Int. Cl.
*B01J 2/04*   (2006.01)
*B01J 2/18*   (2006.01)
(Continued)

(52) U.S. Cl.
CPC .................. *B01J 2/04* (2013.01); *B01J 2/18* (2013.01); *B05B 1/083* (2013.01); *B05B 3/1021* (2013.01); *B05B 3/14* (2013.01)

(58) Field of Classification Search
CPC ........ B01J 2/02; B01J 2/04; B01J 2/18; B05B 3/14; B05B 1/083
(Continued)

(56) References Cited

U.S. PATENT DOCUMENTS 5,891,212 A * 4/1999 Tang ....................... B22F 1/065
264/9
11,745,156 B2 * 9/2023 Dits ........................... B01J 2/18
264/8

FOREIGN PATENT DOCUMENTS

CN    104803732 A    7/2015
EP    0233384 A2 *  8/1987 ................ B01J 2/18
(Continued)

OTHER PUBLICATIONS

International Search Report and Written Opinion for PCT/NL2021/050078 dated May 20, 2021 (11 pages).
(Continued)

*Primary Examiner* — Seyed Masoud Malekzadeh
*Assistant Examiner* — Vipul Malik
(74) *Attorney, Agent, or Firm* — KDW Firm PLLC

(57) ABSTRACT

An apparatus for producing prills includes a hollow body rotatable about a first axis, the body having a wall rotationally symmetrical around the first axis forming an interior space, the wall including nozzles for generating jets of liquid in a radially outward direction with respect to the first axis when rotating the hollow body; a second body disposed in the hollow body forming a gap between the hollow body and the second body; a liquid inlet for supplying a flow of liquid to the gap; a rotary drive unit for driving the hollow body
(Continued)

around the first axis; a reciprocating drive-unit for reciprocally moving the hollow body and/or second body with respect to the other body along the first axis of rotation for applying reciprocal pressure on the jets; and a coupling for enabling relative rotations between the one of the hollow body and second body and the reciprocating drive-unit.

19 Claims, 10 Drawing Sheets

(51) Int. Cl.
    *B05B 1/08*     (2006.01)
    *B05B 3/10*     (2006.01)
    *B05B 3/14*     (2006.01)

(58) Field of Classification Search
    USPC .................................................. 425/6; 264/9
    See application file for complete search history.

(56) References Cited

FOREIGN PATENT DOCUMENTS

| | | |
|---|---|---|
| EP | 2008709 A1 | 12/2008 |
| WO | 2018164652 A1 | 9/2018 |

OTHER PUBLICATIONS

International Preliminary Report on Patentability for the International Application No. PCT/NL2021/050078, dated Jul. 28, 2022, 6 pages.

\* cited by examiner

APPARATUS FOR PRODUCING PRILLS

This application is a national stage filing under 35 U.S.C. 371 of pending International Application No. PCT/NL2021/050078, filed Feb. 5, 2021, which claims priority to Netherlands Patent Application No. 2024843, filed Feb. 5, 2020, the entirety of which applications are incorporated by reference herein.

The invention relates to an apparatus for producing prills, use of the apparatus and a method of manufacturing the apparatus.

Prilling is a known process for converting a quantity of liquid, in particular a quantity of a molten substance, into a plurality of reasonably uniform spherical particles. It comprises two operations: firstly, generating liquid drops from the quantity of liquid and secondly, solidifying the liquid drops individually by cooling as they fall through a rising ambient air stream. Since there is no agglomeration, the size distribution of the drops determines that of the product. Plastic prills and washing powders are examples of resulting products.

By installing a droplet generator at the top of a prilling tower, which is essentially a large cooling tower, heat is transferred from the drops to the air as it falls down and solidifies, wherein the tower has to be of sufficient height for the particles to be strong enough not to break on impact with the tower floor.

Typically two approaches for generating these droplets are distinguished. The first approach uses a static prilling bucket, which in its simplest form can be best compared to a shower head, wherein liquids are pushed through a stationary bucket comprising distributed nozzles for generating jets of liquid. These jets break up after a certain distance thereby forming droplets. The second approach uses a rotary prilling bucket. Rotary prilling buckets comprise distributed nozzles in the side wall and/or bottom. By spinning the bucket at a certain rotational speed, centrifugal forces push the liquid through the nozzles, thereby generating the jets. Prilling apparatuses comprising rotary prilling buckets tend to have a larger production capacity than those comprising stationary buckets.

An important step in the prilling process is generating droplets from the flow of liquid, in particular precisely and accurately controlling the size of the droplets and thereby of the resulting prills. The distribution of the size of the prills (also known as the particle size distribution) generated using existing droplet dispensing methods is typically quite broad. Specifically, they typically produce "dust-particles", which reduce the yield of the process, and tend to contaminate the surrounding of the installation. On the other hand, they also typically produce droplets so large, that they are not sufficiently solidified at the end of the process, i.e. when they reach the tower floor. As a result, they break upon impact and may "glue" together the spherical particles that are collected at the bottom of the tower. This leads to a further reduction of the yield of the process.

It is an object of the invention to alleviate at least a part of the above mentioned problems. Specifically, it is an object of the invention to increase the prilling yield.

Thereto, the invention provides an apparatus for producing prills from a flow of liquid, the apparatus comprising:
- a hollow body arranged to rotate about a first axis of rotation, the hollow body comprising a wall that is arranged rotation symmetrically around the first axis, thereby enclosing an interior space, the wall being provided with a plurality of through-holes forming nozzles for generating jets of liquid in at least a radially outward direction with respect to the first axis when rotating the hollow body;
- a second body being shaped to fit into the interior space of the hollow body, wherein the second body is nested inside the hollow body, such that a gap is present between an inner surface of the wall of the hollow body and an outer surface of the second body;
- a liquid inlet in liquid connection with the gap and arranged for supplying the flow of liquid, such as a molten substance, to the gap;
- a rotary drive unit for driving the rotational motion of at least the hollow body around the first axis of rotation;
- a reciprocating drive-unit arranged for reciprocally moving one of the hollow body and second body with respect to the other of the hollow body and second body along the first axis of rotation for applying a reciprocal pressure excitation on the jets of liquid; and
- a coupling mechanism arranged between the reciprocating drive-unit and the one of the hollow body and second body, wherein the coupling mechanism is arranged for enabling relative rotations between the one of the hollow body and second body and the reciprocating drive-unit.

By reciprocally driving, by means of the reciprocating drive-unit, one of the hollow body and second body along the axial direction of the first axis, a changing pressure is applied to the liquid that is present in the gap. It is noted that the second body is suspended, i.e. nested, in such a manner that a gap is formed that is large enough such that the hollow and second bodies do not contact each other, even when. These pressure pulses propagate to the jets of liquids that are generated through the nozzles of the wall of the hollow body and result in an even break up of the jet into droplets that are sized substantially more evenly. In order to improve the accuracy with which the pressure variation imposed on the liquid can be controlled, the rotations, at least around an axis parallel to the first axis, of the one of the hollow body and second body and the reciprocating drive-unit are decoupled. Hereby, the reciprocating drive-unit does not have to rotate with the hollow body, which also enables a more simple and robust construction of the reciprocating drive-unit, nor does it have to be able to cope with any torsional forces, such as those propagating from the one of the hollow body and second body, that would otherwise be introduced to the reciprocating drive-unit. For instance, even if only the hollow body would be driven, the liquid being present in the gap would effectively act as a hydraulic coupling, thereby transferring a torque to the second body. Hence, decoupling the reciprocating drive-unit from these rotations and associated torques enables using a stacked piezo element in the reciprocating drive unit Since these are able to generate vibrations in a large band of frequencies with a sufficiently large force-amplitude and can be controlled precisely, strong vibrations of small amplitudes can be generated at a predetermined frequency and transferred to the one of the hollow body and second body. This enables exciting the liquid that is in the gap by reciprocal pressure excitations having the predetermined frequency. Piezo elements can, however, be extremely sensitive to torsional loading and thus easily damage.

The apparatus enables creating a substantially uniform pressure distribution in the liquid over substantially the full circumference of the interior space. It enables controlling the size of the droplets more precisely and accurately, thereby improving the performance of the prilling process in terms of particle/drop size distribution. Moreover, it allows for distributing the drops more uniformly across the width of a prilling tower, thereby further increasing the yield of the prilling process. The apparatus thus allows for creating droplets with less variation in size, when compared to a droplet dispensing apparatuses according to the prior art. The flow of liquid, such as a molten substance, is in the prilling process transformed to droplets, which can solidify over time thereby obtaining prills. It should be noted that the apparatus can also be applied in other processes wherein dispensing droplets with less variation in size is advantageous, such that the invention also relates to an apparatus for generating droplets from a flow of liquid.

In a preferred embodiment, the hollow body is at least partially substantially cylindrically and/or conically shaped, wherein the interior space is at least partially substantially cylindrically or conically shaped, and wherein the second body is shaped substantially similar to the interior space of the hollow body, such that a width of the gap is substantially constant along an entire circumference of the second body. In such a hollow body a substantially uniform pressure distribution can be created in the liquid over substantially the full circumference of the interior space, which in turn improves the performance in terms of uniformly sized drops and also allows to distribute them more uniformly across the width of a prilling tower, thereby increasing the yield of the prilling process.

In a preferred embodiment the coupling mechanism comprises a first rotational bearing unit and a second axis of rotation, wherein a second part of the rotational bearing unit is allowed to rotate with respect to a first part of the first rotational bearing unit around the second axis of rotation and wherein a lower end of the reciprocating-drive unit is arranged to move in a direction substantially parallel to the second axis between a first and second position, and wherein the lower end is coupled to the first part of the first rotational bearing unit and the one of the hollow body and second body is coupled to the second part of the first rotational bearing unit. The reciprocating-drive unit and the one of the hollow body and second body are thereby effectively coupled through the rotational bearing, such that substantially no damaging torsional loads are transferred to the reciprocating drive unit. It is then further preferred that the hollow body, second body and the first rotational bearing unit are arranged coaxially, such that the first and second axes of rotation coincide. Hereby substantially only axial forces act during use on the first rotational bearing unit, such that there is no need to transfer any other reaction forces to, for instance, a supporting frame of the apparatus and a robust and simple construction can be achieved.

The apparatus, according to a preferred embodiment, further comprises a controller that is arranged for driving the reciprocating drive-unit with a predefined frequency and amplitude of motion. The controller allows customizing the frequency and/or amplitude with which to drive the reciprocating drive unit such that the yield is further increased. It was, for instance, found that an operational frequency and/or operational amplitude for driving the reciprocating driving unit can be determined, for instance, on the basis of the viscosity of the liquid, whereby the jet breaks up into droplets that are sized substantially more evenly and thereby increases yield.

In a preferred embodiment, an upper end of the reciprocating drive-unit is coupled to a frame assembly and wherein the coupling mechanism is suspended in the axial direction from the reciprocating drive-unit. This allows for the use of a reciprocating drive-unit that requires a certain amount of tensile pretension in order to operate accurately and reliably.

It is further preferred that a second rotational bearing unit, which is arranged to rotate around a third axis of rotation, is arranged between the reciprocating drive-unit and the frame, wherein the third axis of rotation is substantially parallel, and preferably coincides, with the second axes of rotation. Hereby, the reciprocating drive-unit is arranged between two bearing units and free to rotate around its axis. Even in case the first bearing unit would (partly) fail, the second bearing unit is still able to prevent that the reciprocating drive-unit has to take up an excess torque originating from the one of the hollow body and second body.

In a preferred embodiment of the apparatus, the coupling mechanism comprises a rotational blocking mechanism for blocking substantially any rotation of reciprocating drive-unit around the second axis of rotation. Due to, for instance, a small amount of friction in the coupling mechanism, a relatively small torque might still be able to pass through the coupling mechanism. By providing the blocking mechanism, this torque is taken up by the blocking mechanism and thereby diverted around the reciprocating drive-unit. It is preferred that the blocking mechanism comprises a blocking pin for blocking the rotation (with respect to the frame), as this allows for a simple and reliable means of blocking a rotation.

In a preferred embodiment, the reciprocating drive-unit comprises a stacked piezo-electric element, wherein the stacked piezo-electric element is arranged for contracting and/or expanding in a direction substantially parallel to the first axis. Stacked piezo-electric element can deliver the forces required for propagating the pressure variation, or pressure pulses, to the jets, such that they break up in more equally sized droplets. In addition the stacked piezo-electric element can be driven accurately in terms of frequency and amplitude, even at the force levels required.

A preferred embodiment, relates to the apparatus comprising a biasing mechanism for preloading the reciprocating drive-unit. Certain types of actuators require a certain amount of pre-loading to function properly. As non-limiting example, stacked piezo-electric elements are available that require a minimum predefined amount of tensile preload to be able to reliably function. It is for instance preferred that the biasing mechanism comprises the coupling mechanism and the one of the hollow body and second body, wherein the coupling mechanism and the one of the hollow body and second body are suspended from the reciprocating drive-unit such that a tensile preload is applied to the reciprocating drive-unit. Hereby gravity itself acts as the pre-load applied to the reciprocating drive-unit, such that a simple and robust biasing mechanism can be obtained.

In a preferred embodiment, the apparatus comprises a shaft-assembly comprising a first and second shaft, wherein the second shaft is arranged between the coupling mechanism and the one of the hollow body and second body and wherein the first shaft is arranged between the rotary drive unit and the other of the hollow body and second body. As the second body is arranged within the interior space of the hollow body and the bodies need to driven in a different manner, the shaft-assembly is arranged such that the second shaft is arranged between the coupling mechanism and the one of the hollow body and second body and allows for driving the one of the hollow body and second body in a reciprocating manner; and such that the first shaft is arranged between the rotary drive unit and the other of the hollow body and second body to allow to rotate at least the other of the hollow body and second body, thereby subjecting the liquid in the gap to the centrifugal forces. It is preferred that the first and second shafts are arranged coaxially, hereby a compact shaft assembly is obtained that is suited for the described purpose. Preferably, the first shaft is arranged to at least partially enclose the second shaft in the radial direction, or wherein the second shaft is arranged to at least partially enclose the first shaft in the radial direction. Hereby, one can also obtain a compact shaft-assembly, wherein the inner shaft is also shielded by the outer shaft.

Alternatively, or additionally, the shaft-assembly comprises a third bearing system, wherein the third bearing system is arranged between the first and second shafts, wherein the third bearing system is preferably arranged to couple the first and second shafts, the third bearing system comprising at least a linear bearing member, such that the second shaft is arranged to move with respect to the first shaft in the axial direction and wherein the linear bearing member is preferably further arranged such that the first shaft is arranged to rotate around its longitudinal axis with respect to the second shaft; these are preferably the only relative movements that the third bearing system allows. The third bearing system thereby enables a smooth operation with reduced friction. In addition, by coupling the first and second shafts through the third bearing system, forces exerted on the second shaft are, apart from the torque around the shaft and the axial forces, transferred to the first shaft instead of the coupling mechanism.

In a preferred embodiment, a rotational transfer mechanism is arranged between the hollow body and second body and wherein the rotational transfer mechanism couples the rotational motion around the first axis of the hollow body and second body. Hereby the rotational motion that is transferred from the rotary drive to the hollow body, is transferred to the second body as well. As both bodies thereby rotate with the same rotational speed, shear effects in the liquid are reduced, these shear effects would, for instance, be present due to a difference in speed of the hollow body and second body and having a speed reducing effect on the liquid. Hence, by coupling the rotational motion of the hollow body and second body, the centrifugal forces acting on the liquid in the gap, and thereby the pressure of the liquid acting on the inner surface of the wall of the hollow body, can thus be controlled more accurately.

Preferably, the rotational transfer mechanism comprises a male connecter arranged at a nonzero radial distance from the first axis onto one of the hollow and second body and a female connector arranged to the other of the hollow and second body and wherein the female connecter is arranged for slidably receiving the male connector, for coupling the rotational motion of the hollow and second body while allowing for the relative movement between the hollow and second body in the axial direction. Hereby, a simple and robust coupling of the rotations can be obtained.

In a preferred embodiment the liquid inlet debouches in the second body; and wherein the second body comprises at least one through hole for forming a liquid connection between the gap and the liquid inlet. In use the liquid is hereby supplied to the gap located between the hollow and second bodies. It is then preferred that a primary through hole runs substantially parallel to the first axis and wherein the primary through hole is arranged to debouche in a lower section of the hollow body. Hereby, the supply of liquid to the gap is substantially evenly over the circumference of the gap in radial direction, whereby it is then also preferred if the primary through hole is arranged substantially centrally in the second body. Alternatively, or additionally, secondary through holes, running at least outwardly in the radial direction as seen from the first axis, are arranged in the circumference of the of the second body. Hereby, the supply of liquid can be distributed over the gap, such that a more evenly distribution over the circumference of the gap in the axial direction is obtained. It is then preferred that the secondary through holes of the second body and the nozzles, i.e. liquid outlets, of the hollow body, as seen along the radial direction, are arranged at a nonzero distance from each other. By arranging the holes and outlets such that they substantially do not overlap, a more even pressure distribution can be obtained over the inner wall of the hollow body. A more even pressure distribution at the wall leads to more even (liquid) conditions at the nozzles arranged in the wall. Hereby, the conditions of the jets are more evenly and thus the droplets are formed more evenly over the different nozzles.

In a preferred embodiment, substantially fin-shaped members are arranged in the through-hole of the second body. Fin shaped members can be used for imparting the rotational motion of the hollow and/or second body onto the flow of liquid entering from the liquid inlet. The fin-shaped members preferably protrude inwardly from a circumferential wall that delimits the through hole. It is further preferred that the fin-shaped members protrude substantially radially inwardly and/or wherein they run over substantially the full height of the through hole at at least the location of the circumferential wall. Hereby, the liquid flow can effectively be forced into a spinning motion by the rotation, thereby forming a stable vortex of the liquid inside the hollow or secondary body.

In a preferred embodiment, the hollow body and second body are bucket shaped and wherein the reciprocal drive-unit is arranged for reciprocally varying the width of the gap between the hollow body and second body. A bucket shaped body can, for instance, be shaped on the outside like a truncated cone, i.e. a conical frustum. The hollow body and/or second body comprise preferably a substantially similarly shaped interior space. Due to the bucket shape (i.e. truncated cone or conical frustum), the bodies are substantially symmetrical, such that, by arranging the bodies substantially co-axial, an even gap is obtained between the outer surface of the second body and the inner surface of the wall of the hollow body. By reciprocally driving the one of the hollow body and second body, the width of the gap is reciprocally varied, such that pressure pulses can be introduced in the liquid that can be present in the gap.

In a second aspect, the invention also relates to the use of the apparatus as disclosed in all its embodiments.

In a further aspect, the invention also relates to a method of manufacturing an apparatus for producing prills from a flow of liquid, the method comprising:

providing a hollow body arranged to rotate about a first axis of rotation, the hollow body comprising a wall that is arranged rotation symmetrical around the first axis, thereby enclosing an interior space, the wall being provided with a plurality of through-holes forming nozzles for generating jets of liquid in at least a radially outward direction with respect to the first axis when rotating the hollow body;

providing a second body being shaped to fit into the interior space of the hollow body, wherein the second body is nested inside the hollow body, such that a gap is present between an inner surface of the wall of the hollow body and an outer surface of the second body;

providing a liquid inlet in liquid connection with the gap and arranged for supplying the flow of liquid to the gap;

providing a rotary drive unit for driving the rotational motion of at least the hollow body around the first axis of rotation;

providing a reciprocating drive-unit arranged for reciprocally moving one of the hollow body and second body with respect to the other of the hollow body and second body along the first axis of rotation for applying a reciprocal pressure excitation on the jets of liquid; and providing a coupling mechanism arranged between the reciprocating drive-unit and the one of the hollow body and second body, wherein the coupling mechanism is arranged for enabling relative rotations between the one of the hollow body and second body and the reciprocating drive-unit.

By providing these parts of the apparatus and assembling these for obtaining the apparatus, the advantages relating to the use of the apparatus can be obtained. The method of manufacturing relates to all possible embodiments given above.

The present invention is further illustrated by the following figures, which show preferred embodiments of the apparatus for producing prills, or in other words the droplet dispensing apparatus for generating droplets, from a flow of liquid, and the apparatus, according to the invention, and are not intended to limit the scope of the invention in any way, wherein:

FIG. 1 schematically shows a 3D perspective view an embodiment of a droplet dispensing apparatus that is used in the invention.

FIG. 2 schematically shows a cross-sectional view of an embodiment of the apparatus for producing prills of FIG. 1 in a first plane.

FIG. 3 schematically shows the cross-sectional view of the droplet dispensing apparatus in the first plane zoomed in on a top section of the apparatus.

FIG. 4 schematically shows the cross-sectional view of the droplet dispensing apparatus in the first plane zoomed in on a bottom section of the apparatus.

FIG. 5 schematically shows a cross-sectional view of the droplet dispensing apparatus of FIG. 1 in a second plane.

FIG. 6 schematically shows the cross-sectional view of the droplet dispensing apparatus in the second plane zoomed in on a top section of the apparatus.

FIG. 7 schematically shows the cross-sectional view of the droplet dispensing apparatus in the second plane zoomed in on a bottom section of the apparatus.

FIG. 8 schematically shows a preferred embodiment of a reciprocal driving-unit and a coupling mechanism for use in the droplet dispensing apparatus.

Figure 11:
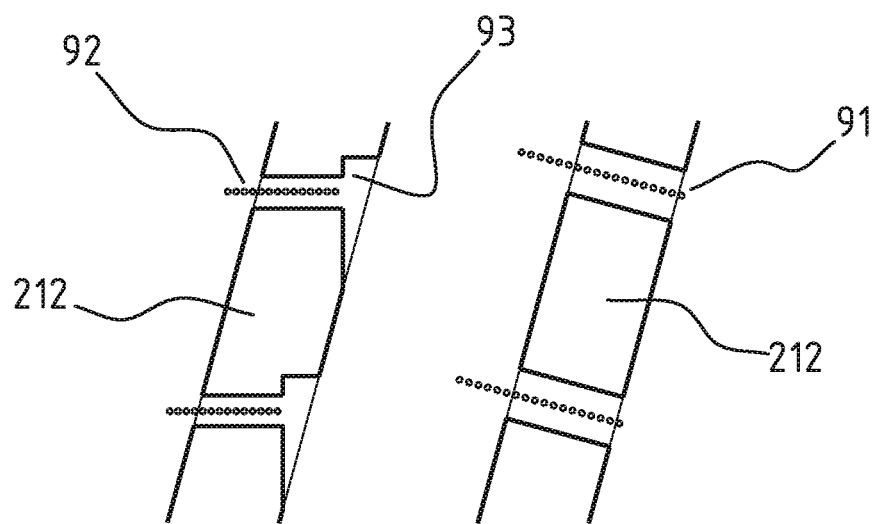

FIG. 11 schematically shows two different types of nozzles arranged in the circumferential wall of the hollow body.

Figure 1:
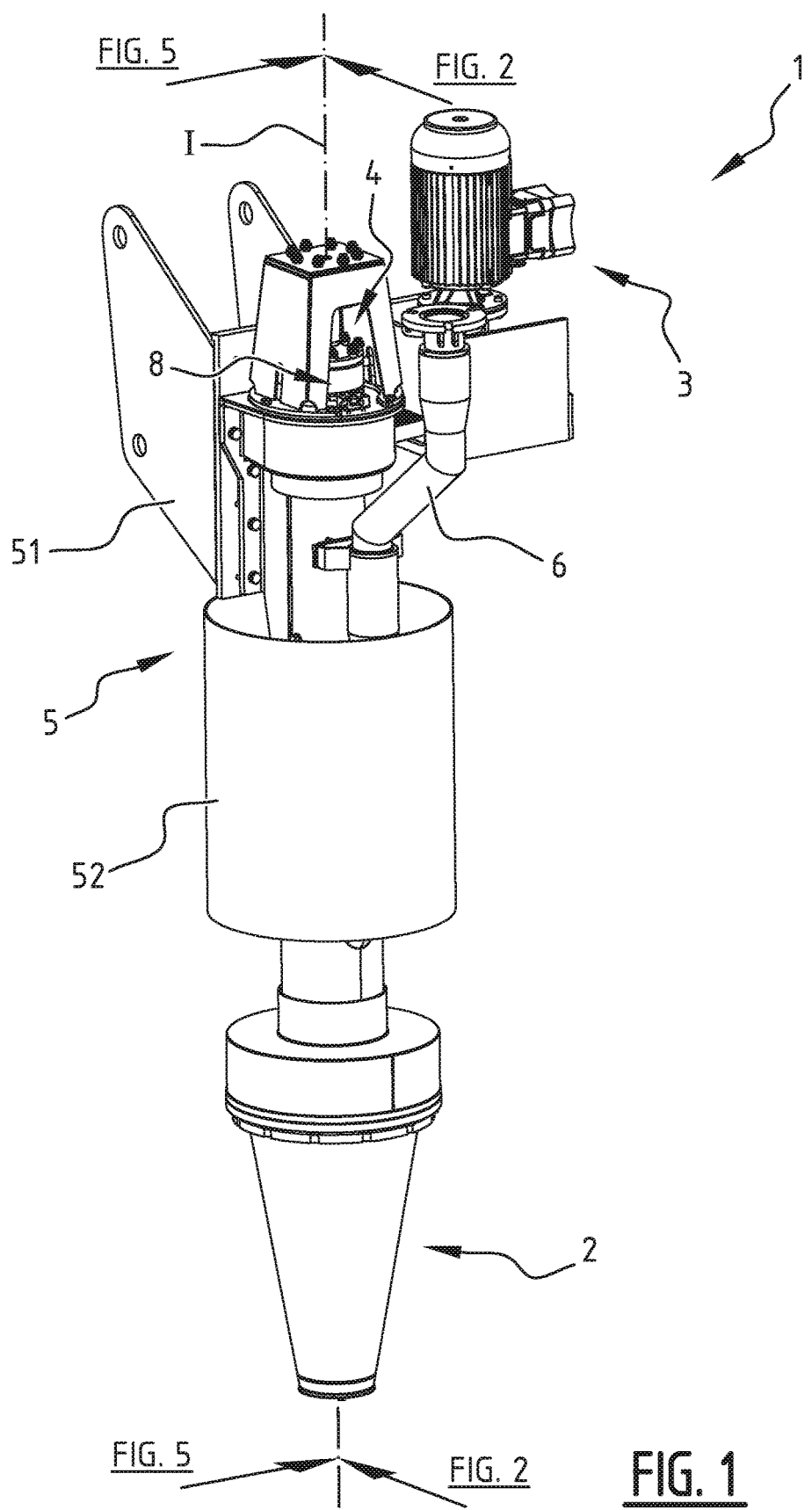

FIG. 1 schematically shows a 3D perspective view an embodiment of the apparatus 1 for producing prills according to the invention. The droplet dispensing apparatus 1 comprises a lower rotating assembly 2 that comprises the hollow and second bodies 21, 22. A rotary drive unit 3 is arranged for driving the rotation of the lower rotating assembly 2, a reciprocating drive unit 4 for reciprocally driving the second body 22 along the axis of rotation I and a coupling mechanism 8 for decoupling rotations from the reciprocating drive unit 4. The apparatus can further comprise a stationary frame assembly 5 that comprise, for instance, a mounting bracket 51 for mounting the apparatus in a suitable cooling tower, i.e. prilling tower (not shown). Also, cylinder 52 resembles the size of the opening through which the apparatus typically needs to be inserted for mounting it in a prilling tower. An inlet piping system 6 is provided for supplying a liquid to the lower rotating assembly 2 of the apparatus 1, as is described in more detail below. With reference to FIGS. 1-8 and 11 the workings of the embodiment of the apparatus 1 will be described below in more detail.

Figure 2:
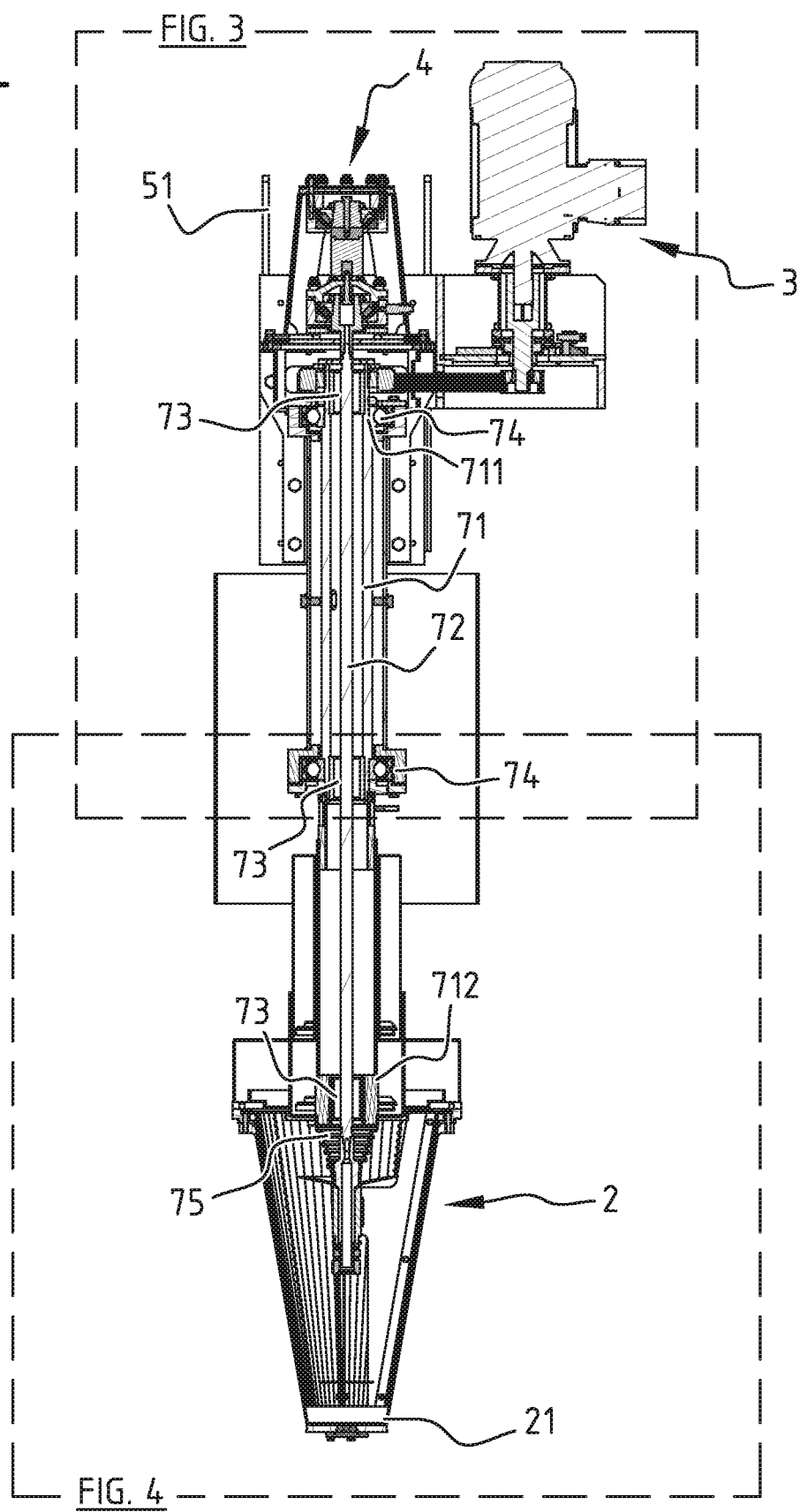
Figure 3:
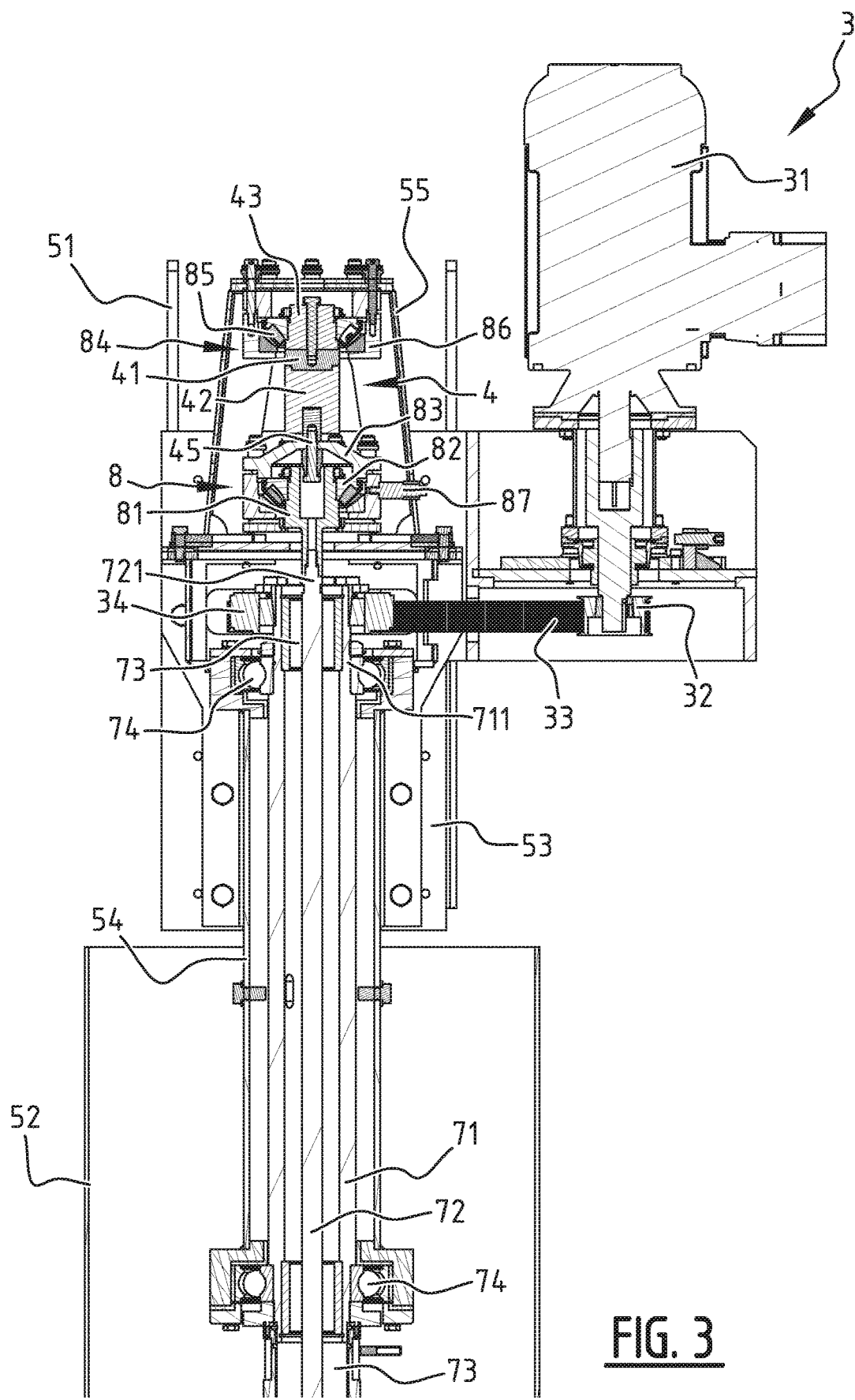
Figure 4:
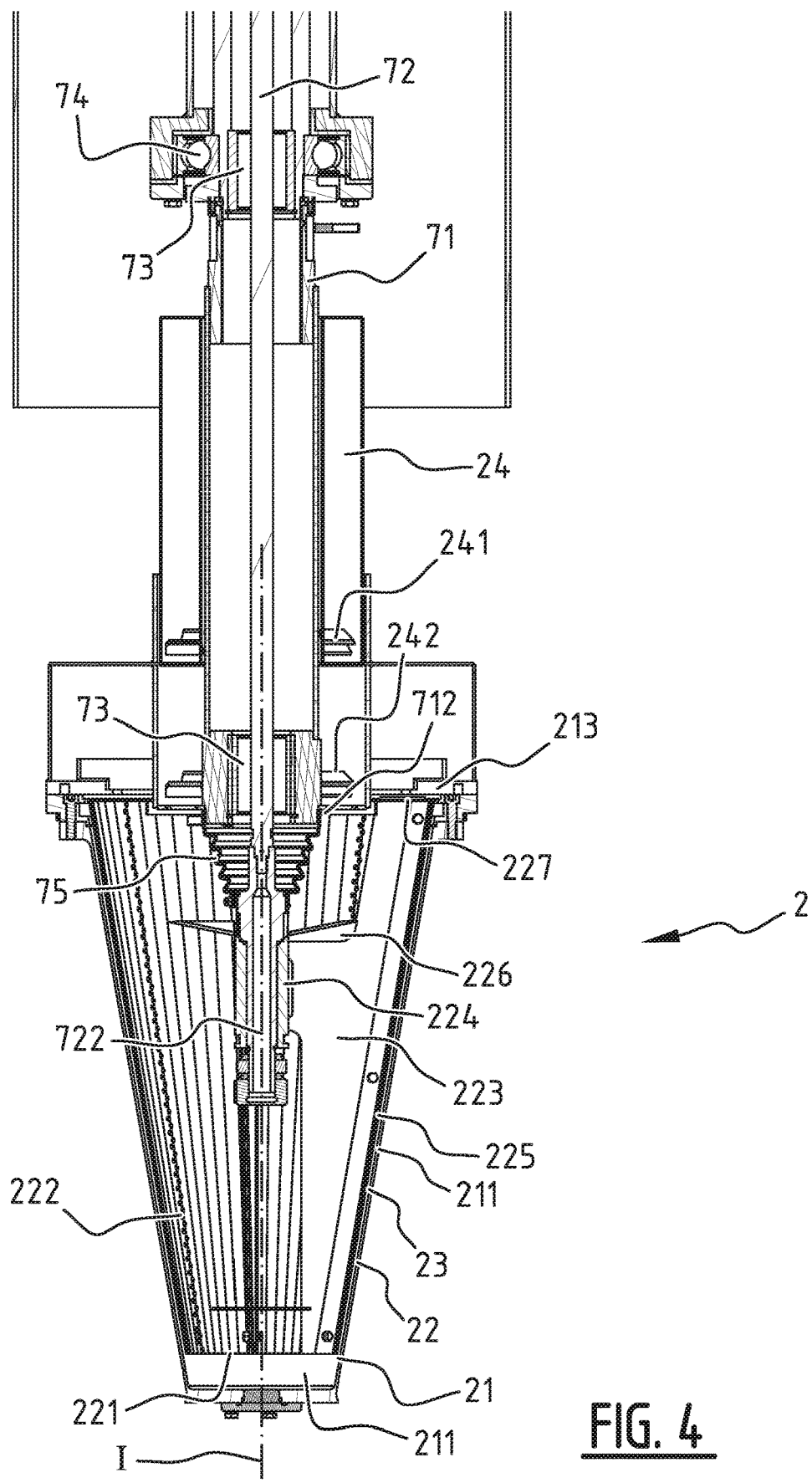
Figure 5:
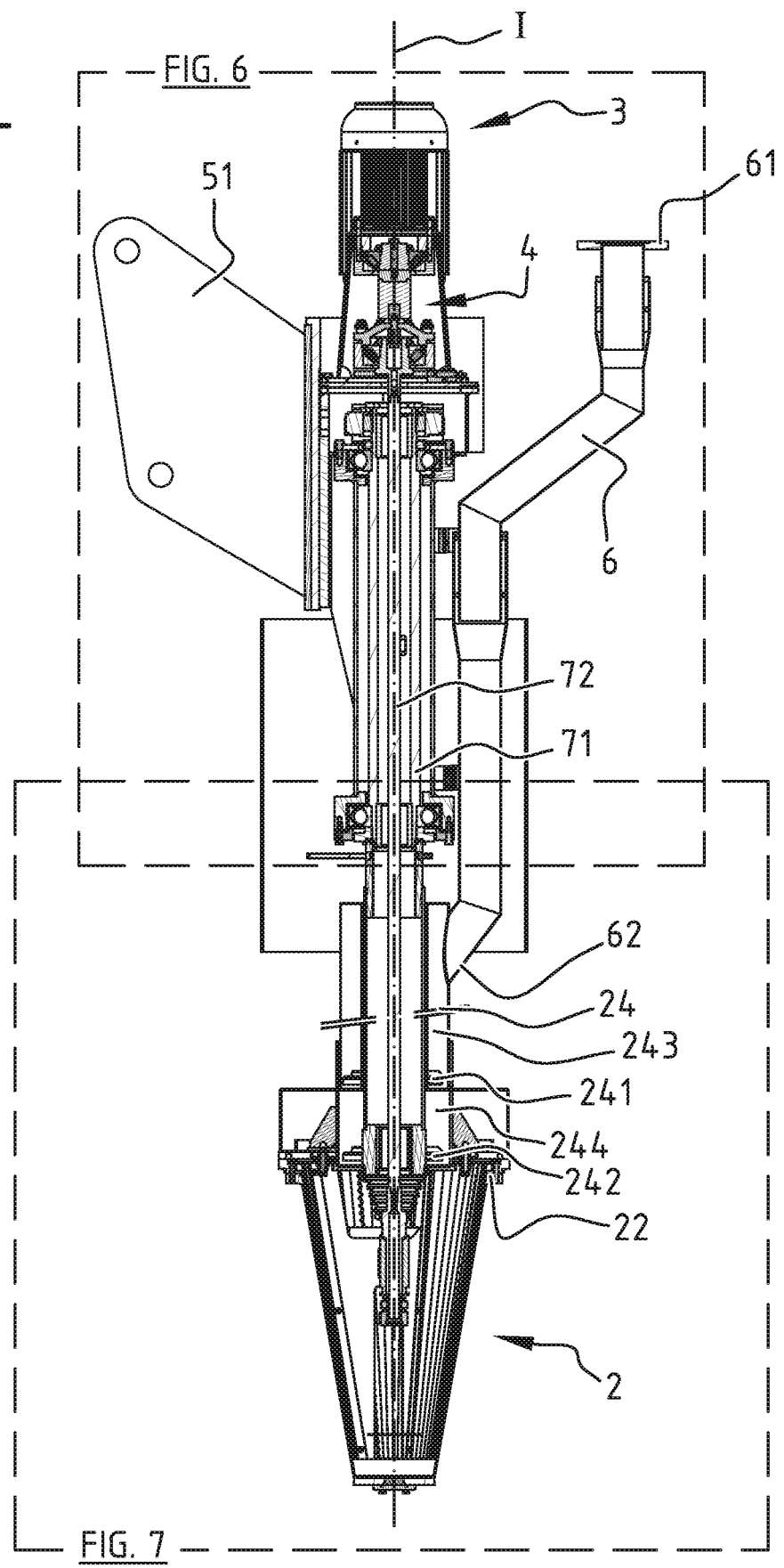
Figure 6:
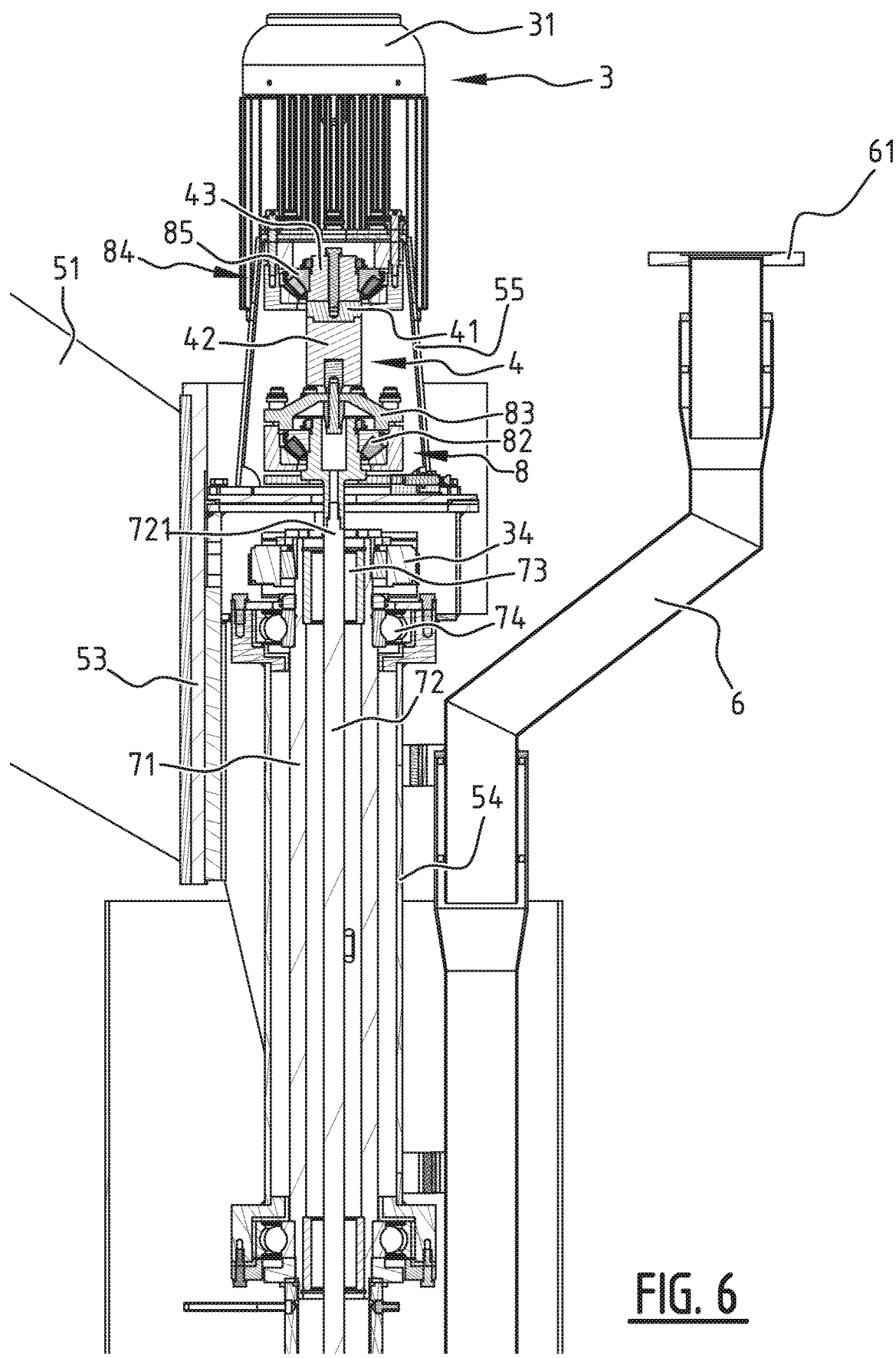
Figure 7:
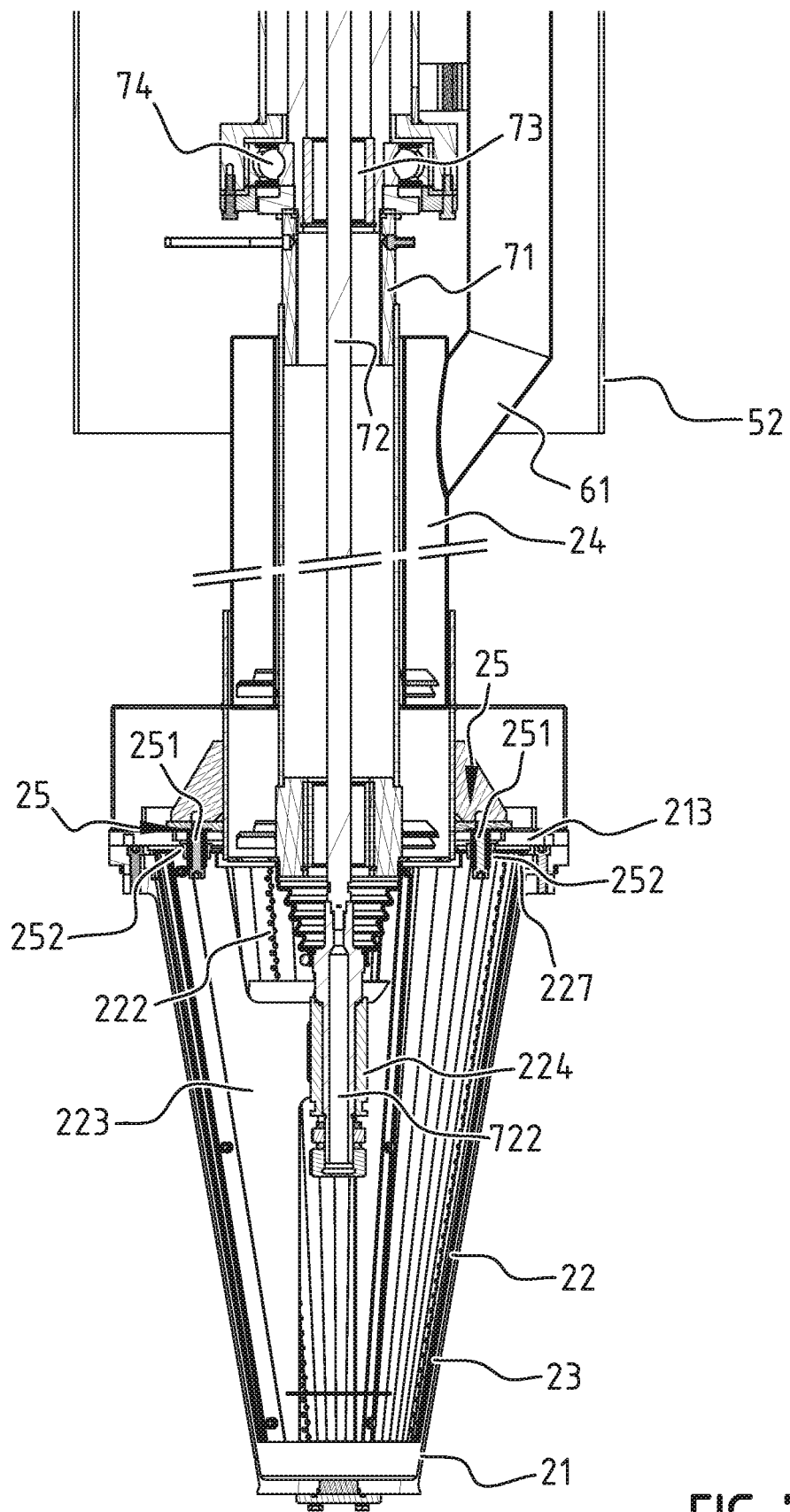

FIGS. 2-4 schematically show the cross-sectional view of the droplet dispensing apparatus 1 of FIG. 1 in a first plane. FIGS. 5-7 schematically show the cross-sectional view of the droplet dispensing apparatus of FIG. 1 in a second plane which is substantially perpendicular to the first plane. Lower rotating assembly 2 comprises a rotating hollow body 21, wherein a rotating second body 22 is arranged. Hollow body 21 and second body 22 are shaped such the second body 22 is shaped (at least on its outside) to fit into, and substantially match in shape with, the inner space 211 of the hollow body 21, thereby forming a gap 23 between the outer surface of the second body 22 and the inner surface of the circumferential wall of the hollow body 21. The hollow body 21 and second body 22 are preferably substantially bucket-shaped (i.e. are formed as hollow conical frustums) and are arranged such that, once installed in a prilling tower, the top sections of the bodies 21, 22 have a larger dimension (e.g. diameter) than the bottom sections of the bodies 21, 22. This aids in a more evenly distribution of the droplets throughout the prilling tower.

The second body 22 can comprise an opening 221 at its bottom in addition to a plurality of smaller through holes 222 that can be arranged over a number of rows of through holes 222 that can be arranged at different (angular) locations in the circumferential wall of the second body 22, as seen around the axis of rotation I. These rows of through holes 222 run can run over substantially the full height of the second body 22.

A central inlet 24 directs, in use, a flow of liquid to an interior space of the second body 22. The central inlet 24 can be fitted with a plurality of flow directing elements 241, 242 that aid in directing the flow towards the interior space of the second member 22 and/or in the direction of rotation. After this, it flows through opening 221 and/or the plurality of through holes 222 to the gap 23. A plurality of through holes, also referred to as nozzles 91, 92, is arranged in the circumferential wall 212 of the hollow body 21. In use, the hollow body 21 spins around the rotational axis I, such that any liquid held in the gap 23 is exposed to the centrifugal forces originating from this spinning, thereby creating a pressure in the liquid and which is forced out the plurality of nozzles 91, 92, thus forming jets of liquid 901, 911 (see FIGS. 9 and 10) that are directed at least partially in the radial outward direction with respect to the rotational axis I. As the width of gap 23 can be reciprocally varied by driving the reciprocating drive unit, as is described in more detail below, pressure pulsations can be introduced to the liquid that is present in the gap 23. These pulsations will propagate to the jets shooting from the nozzles 91, 92. By tuning the frequency and the amplitude with which the width of the gap 23 is varied, pressure pulsations can be obtained that lead to a fast break up of the jets into droplets, wherein substantially equally sized droplets are obtained, such that a spread in droplet-size is significantly reduced.

Nozzles 91, 92 (see FIG. 11) can be arranged in different manners in the circumferential wall 212. For instance, first nozzles 91, second nozzles 92 or any combination of these and other types of nozzles can be arranged in the circumferential wall 212. The first nozzle 91 is arranged as a through hole that is substantially perpendicular to the outer and/or inner surface of circumferential wall 212. The second nozzle 92 is arranged as a through hole that, once the droplet dispensing apparatus is installed in a prilling tower, runs substantially horizontal, i.e. substantially perpendicular to the axis of rotation I. Alternatively, a recession 93 can be arranged in the outer surface of circumferential wall 212 of the hollow body 21, such that the though hole of the second nozzle 92 debouches in the recession 93, wherein the surface of the recession 93 is substantially perpendicular to the through hole of the second nozzle 92.

The second body 22 can further comprise a number of fin-shaped members 223 that extend from a centre-axis connecting body 224 in a substantially radial direction towards the circumferential wall 225 of the second body 22. These fin-shaped members 223 force the liquid that enters the interior space of the second body 22 to rotate with the second body 22. Furthermore, additional flow direction elements 226 can be arranged at a top section of the fin-shaped members 223 to help distribute the liquid throughout the second body 22. Hereby, a stable and substantially constant vortex of the rotating liquid can be obtained in the second and hollow bodies, thereby generating more constant process conditions at the nozzles 91, 92 and thus a better control of the process. In this embodiment, the second body 22 is connected at its top section 226 to the top section 213 of the hollow body 21. The hollow body 21 itself is driven by the rotary drive unit 3. An outer shaft 71 is provided that is connected to the rotary drive unit on a first end 711 and to the top second 213 of the hollow body at the second end 712. The outer shaft 71 can be connected to a stationary frame assembly 5 by means of rotary bearings 74. Stationary frame assembly comprises a frame mounting bracket 51 for installing, or arranging, the droplet generating apparatus 1 in a prilling tower.

The second body 22 is connected to an inner shaft 72 using the centre-axis connecting body 224 that is arranged to receive and couple to a lower portion 721 of the inner shaft 72. Inner shaft 71 is for the most part enclosed by the outer shaft 72 and supported by a number of sliding bearings 73, such that the inner shaft 71 is, preferably only, movable with respect to the outer shaft 72 in a direction along the axis of rotation I and in the rotational direction around axis of rotation I. To shield the sliding bearings 73 and the space between the inner and outer shafts 71, 72 from dust and/or liquid contamination, a flexible shaft cover 75 is arranged between the bottom section 712 of the outer shaft 71 and the centre-axis connecting body 224.

FIG. 3 schematically shows the cross-sectional view of the droplet dispensing apparatus in the first plane zoomed in on a top section of the apparatus 1. Rotary drive unit 3 is provided for driving the outer shaft 71 using, in the current embodiment, a second pulley 34 that can be directly connected to the first end 711 of the outer shaft 71. The rotary drive unit 3 can comprise (electro-) motor 31 that drives a first pulley 32 and wherein the first and second pulleys 32, 34 are coupled by means of a drive belt 33 that transfers the rotary motion from the motor 31 to the outer shaft 71. Note however, that any other suitable rotational transfer, or gearing, mechanism can be used for this. The outer shaft 71 is coupled, through rotational bearings 74 to a shaft holding frame 54, which is formed by a tubular member connecting and holding the rotational bearings 74, and wherein the shaft holding frame 54 is in turn connect to a frame base member 53 that also comprises the mounting bracket 51.

The inner shaft 72, which for the largest part enclose by the outer shaft 71, extends at its upper end 721 from the first end 711 of the outer shaft. The upper end 721 is received by an output shaft 81 of the coupling mechanism 8. The coupling mechanism 8, which comprises a rotational bearing 82, takes up the rotational motion of the inner shaft 72, thereby shielding the reciprocating drive-unit 4 from any torsional forces that could potentially damage the vibrating element 41, which is preferably a stacked-piezo element. Stacked-piezo elements are able to generate vibrations in a large band of frequencies, with a sufficiently large force-amplitude and be controlled precisely, such that small amplitudes of vibration can be obtained.

To secure the vibrating element 41 accordingly, the element 41 is held between a lower 42 and upper connecting member 43. The vibrating element 41 is directly connected and held to the upper connecting member 43. The lower connecting member 42 is directly coupled to an upper section 83 of the coupling mechanism 8. The upper connecting member 43 is held by a secondary coupling mechanism 84 that also comprises a rotational bearing 85. Hereby, the reciprocating drive-unit 4 is unconstrained in its rotation around axis of rotation I, such that even if minor torsional forces are transferred through the coupling mechanism 8, the vibration element 41 is virtually isolated from any potentially damaging torsional forces that could potentially transfer from the inner shaft 72. To further aid in this, coupling mechanism 8 comprises a blocking pin 86 that transfers resulting torsional forces to a frame suspension member 55.

The secondary coupling mechanism 84 is directly connected through its upper, stationary, section 86 to the suspension member 55. Hereby, the reciprocating drive unit 4, coupling mechanism 8, inner shaft 72 and second body 22 are all suspended from the suspension member 55. The axial forces from these parts are thus transferred through the vibrating element 41, which thereby has a preload applied to it. These suspended parts 8, 72, 22 thus effectively form a biasing mechanism for the vibrating element 41. Suspension member 55 is part of the stationary frame assembly 5.

FIG. 5, which shows a cross-sectional view taken in a plane substantially perpendicular to the plane of FIGS. 2-4, shows the liquid inlet section 6 that comprises an assembly of tubular members and is arranged to connect on its first end 61 to a liquid feed system and on its second end 62 it debouches in the central inlet 24. Through a stationary first section 244 of the central inlet 24, the liquid is arranged to flow to a second section 244 of the central inlet 24, wherein the second section 242 rotates with the hollow body 21.

Figure 9:
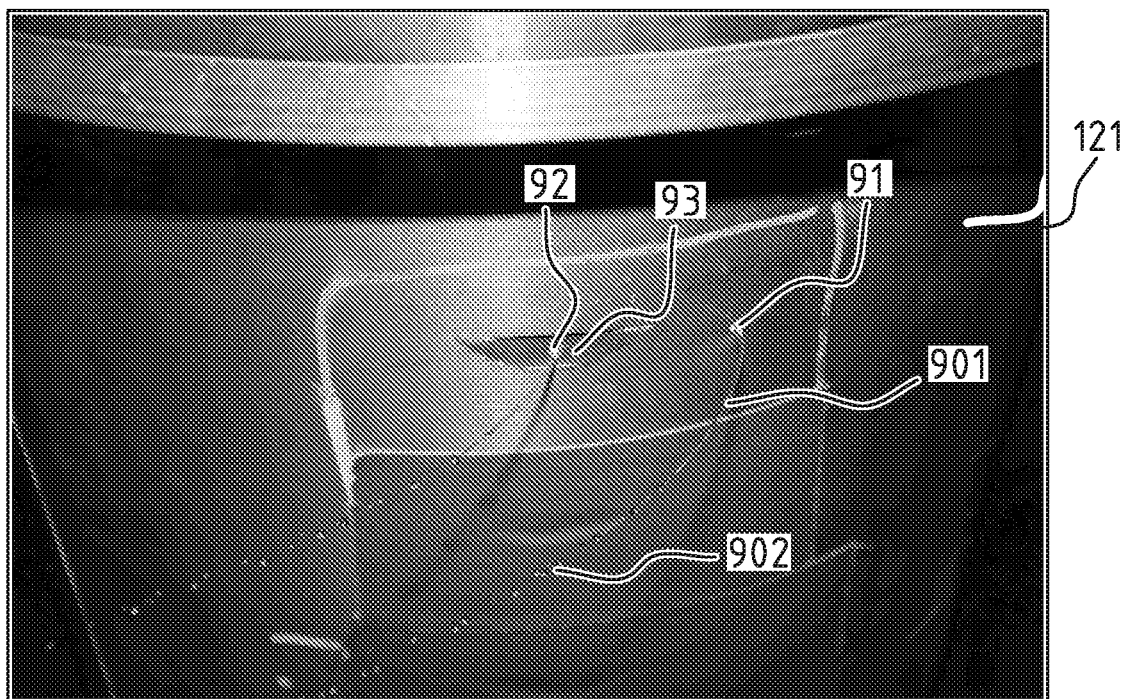
FIG. 9 shows a picture of experimental results of traditional droplet dispensing using a rotary droplet generator.

In use, the hollow body 21 is driven by the rotary drive unit 3 to rotate along the axis of rotation I, as described above. Liquid is fed to the second body 22 through the liquid inlet section 6, such that the liquid reaches the gap 23 through the second body 21 that comprises a number of openings 221, 222. The reciprocating drive unit 4 is in turn used to vary the width of gap 23. In the current embodiment this is achieved by driving the vibrating element 41 that, through the coupling mechanism 8 and inner shaft 72, transfers the reciprocating motion along the axis of rotation I to the second body 22. By controlling the vibrating element 41 according to a predefined frequency and amplitude, pressure pulsations are introduced to liquid held in the hollow body 21. The combination of the centrifugal forces due to the rotation and the pressure pulsations introduced in the liquid, allows jets to form through nozzles 91, 92 that break up in individual droplets, wherein the individual droplets have only a small variation in size (when compared to a traditional rotational droplet generating apparatus), such that they can be considered to be substantially evenly sized.

Results from an experimental setup using such a device are show in in FIG. 10, whereas results from an experimental setup of a traditional rotational droplet generating apparatus are shown in FIG. 9. The photo's show a hollow body 121 comprising both first and second nozzles 91, 92. The second nozzles 92 are arranged to debouche in a recession 93 arranged in the outer surface of the hollow body 121. In FIG. 9 an actual jet of liquid 901 can be seen leaving the nozzles 91, 92, which only after a certain distance break up into a series of differently sized droplets 902. The droplets 902 have a large distribution in size, as the jets breaks up in larger primary droplets and smaller secondary, or satellite, droplets. As further downstream a number of different droplets might recombine to form even larger droplets, a large spread in droplet size is obtained.

Figure 10:
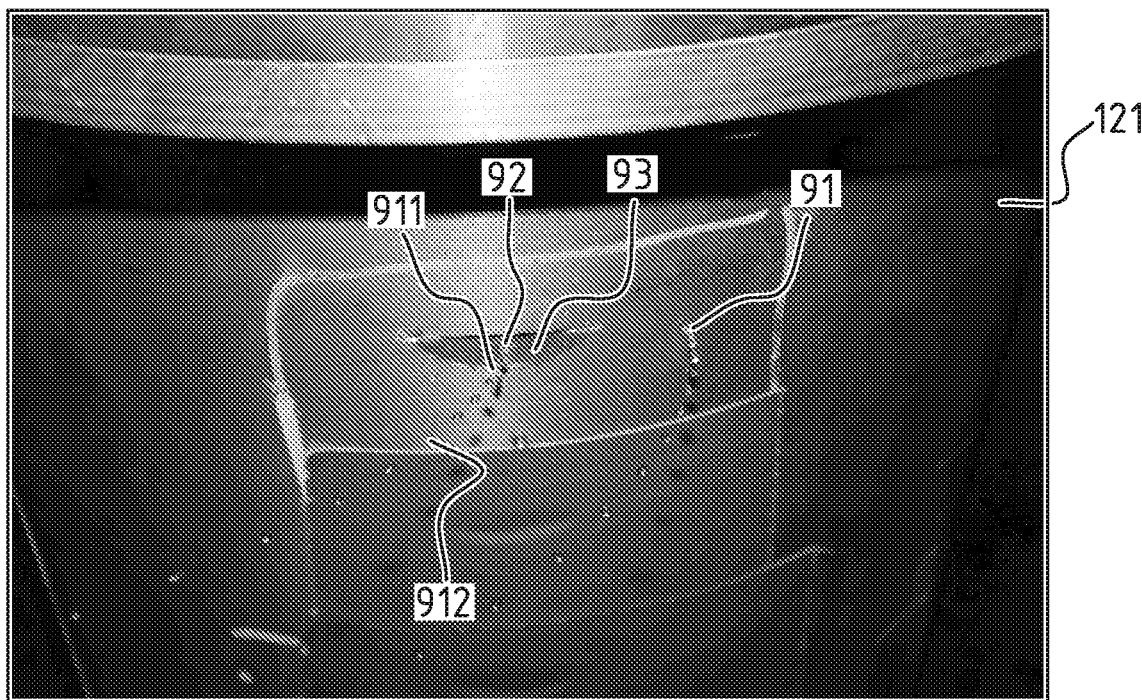
FIG. 10 shows a picture of experimental results of droplet dispensing using a vibro-rotary droplet generator.

In FIG. 10, the liquid in the hollow body 22 is excited by pressure pulsations with a predefined frequency and amplitude. It is clear that the jets 911 start to break up practically immediately after it exits from the nozzles 91, 92 and that the resulting droplets 912 are much more similar in size when compared to droplets 911. In addition, the individual droplets 912 can be seen to spread out in more regular intervals, thereby leading to less merging of droplets. In the experimental setup water/glycerine mixtures having different viscosities have been tested. In the first test, water with a viscosity of 1 mPa*s was used, wherein it was found that excellent results could be obtained (in terms of a narrow distribution in droplet size) by rotating the bucket such that the velocity of the (water) jet is 1.5 m/s and by introducing pressure pulsations caused by introducing vibrations at approximately 280 Hz and with an amplitude 20 μm. When using a somewhat more viscous mixture of 4 mPa*s, the ideal condition were found when velocities of the jet of liquid are 1.3 m/s and by introducing pressure pulsations caused by introducing vibrations at approximately 240 Hz and with an amplitude 35 μm. When using a more extreme mixture having a viscosity of 35 mPa*s, excellent results were obtained for velocities of 1.15 m/s and by introducing the pulsations at approximately 190 Hz and with an amplitude 35 μm.

Figure 8:
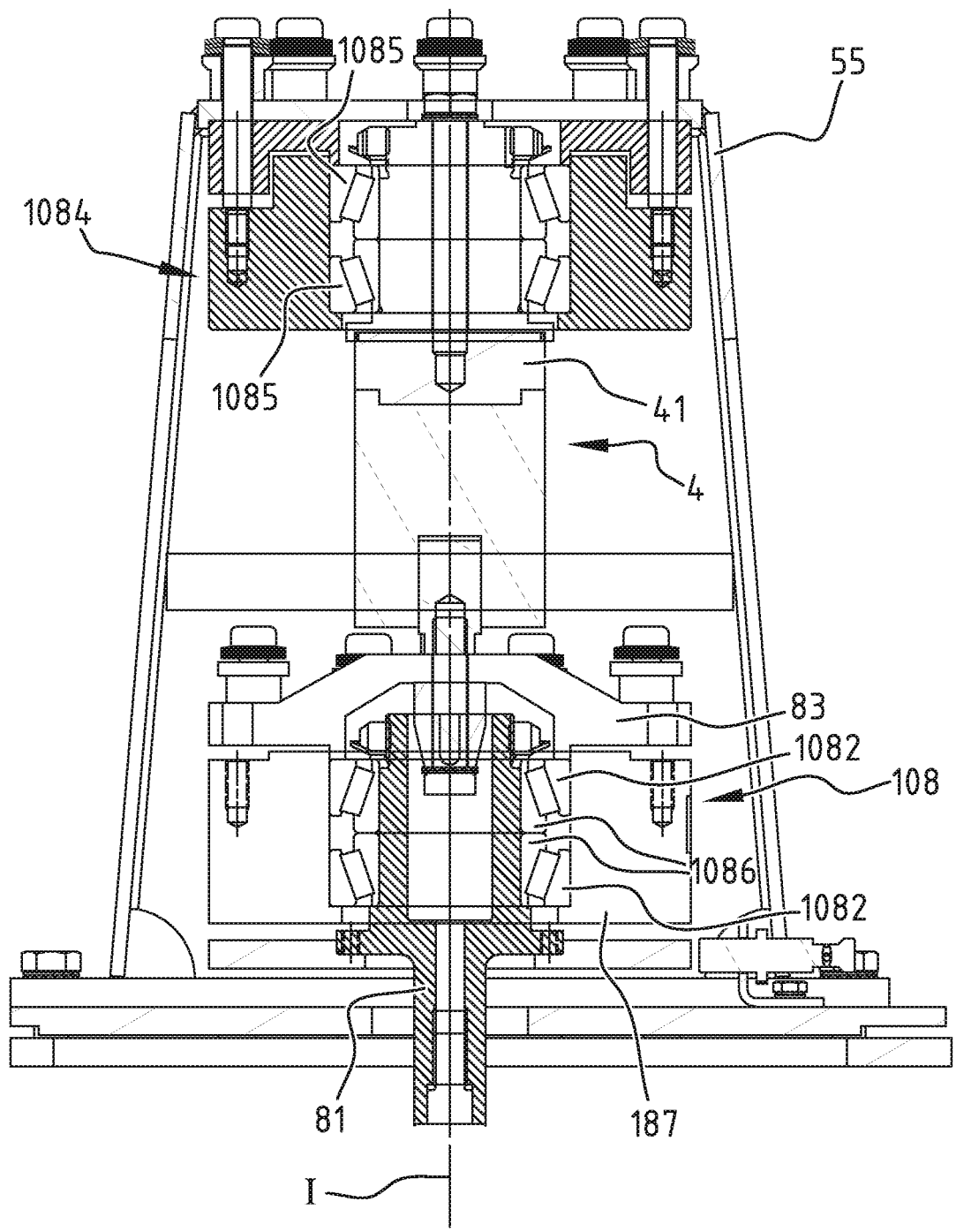

FIG. 8 furthermore shows an alternative embodiment of the coupling mechanism 108 and an alternative embodiment of the secondary coupling mechanism 1084, wherein all the other components are equal to the embodiment shown in FIGS. 1-7. Coupling mechanism 108 comprises two rotational bearings 1082, in particular spherical roller thrust bearings, which are preferably substantially equal. The bearings 1082 are arranged such that the first ends 1086 are arranged adjacent to one and another, such that the bearings only allow for the rotational motion of the output shaft 82 with respect to housing unit 187 of the coupling mechanism 108, such that a reliable coupling mechanism 108 with minimal play in the axial direction is obtained. Play in the axial direction of the coupling mechanism 108 influences the transfer of vibrations from the vibrating element 41 to the second body 22 and would therefore negatively affect the performance of the droplet generating apparatus 1. Also, spherical roller thrust bearings are highly suitable for transferring high axial (i.e. trust) loads, such that a reliable coupling mechanism 108 is obtained for transferring axial forces from the reciprocating driving unit 4 to the second body. Also the secondary coupling mechanism 1084 comprises a similar arrangement of two rotational bearings 1085, in particular spherical roller thrust bearings.

The present invention is not limited to the embodiment shown, but extends also to other embodiments falling within the scope of the appended claims.

The invention claimed is:

1. An apparatus for producing prills from a flow of liquid, comprising:
a hollow body arranged to rotate about a first axis of rotation, the hollow body comprising a wall that is arranged rotation symmetrically around the first axis, thereby enclosing an interior space, the wall being provided with a plurality of through-holes forming nozzles for generating jets of liquid in at least a radially outward direction with respect to the first axis when rotating the hollow body;
a second body shaped to fit into the interior space of the hollow body, wherein the second body is nested inside the hollow body such that a gap is present between an inner surface of the wall of the hollow body and an outer surface of the second body;
a liquid inlet in liquid connection with the gap and arranged for supplying the flow of liquid to the gap;
a rotary drive unit for driving the rotational motion of at least the hollow body around the first axis of rotation;
a reciprocating drive-unit arranged for reciprocally moving one of the hollow body and second body with respect to the other of the hollow body and second body along the first axis of rotation for applying a reciprocal pressure excitation on the jets of liquid; and
a coupling mechanism arranged between the reciprocating drive-unit and the one of the hollow body and second body, wherein the coupling mechanism is arranged for enabling relative rotations, at least around an axis parallel to the first axis, between the one of the hollow body and second body and the reciprocating drive-unit.

2. The apparatus for producing prills according to claim 1, wherein the hollow body is at least partially substantially cylindrically and/or conically shaped, wherein the interior space is at least partially substantially cylindrically or conically shaped, and wherein the second body is shaped substantially similar to the interior space of the hollow body, such that a width of the gap is substantially constant along an entire circumference of the second body.

3. The apparatus for producing prills according to claim 1, wherein the coupling mechanism comprises a first rotational bearing unit and a second axis of rotation, wherein a second part of the rotational bearing unit is allowed to rotate with respect to a first part of the first rotational bearing unit around the second axis of rotation and wherein a lower end of the reciprocating-drive unit is arranged to move in a direction substantially parallel to the second axis between a first and second position, and wherein the lower end is coupled to the first part of the first rotational bearing unit and the one of the hollow body and second body is coupled to the second part of the first rotational bearing unit.

4. The apparatus for producing prills according to claim 3, wherein the hollow body, second body and the first rotational bearing unit are arranged coaxially, such that the first and second axes of rotation coincide.

5. The apparatus for producing prills according to claim 1, wherein the apparatus further comprises a controller that is arranged for driving the reciprocating drive-unit with a predefined frequency and amplitude of motion.

6. The apparatus for producing prills according to claim 1, wherein an upper end of the reciprocating drive-unit is coupled to a frame assembly and wherein the coupling mechanism is suspended in the axial direction from the reciprocating drive-unit; and wherein a second rotational bearing unit, which is arranged to rotate around a third axis of rotation, is arranged between the reciprocating drive-unit and the frame, and wherein the third axis of rotation is substantially parallel with the second axes of rotation.

7. The apparatus for producing prills according to claim 2, wherein the coupling mechanism comprises a rotational blocking mechanism for blocking substantially any rotation of reciprocating drive-unit around the second axis of rotation; and wherein the blocking mechanism comprises a blocking pin for blocking the rotation.

8. The apparatus for producing prills according to claim 1, wherein the reciprocating drive-unit comprises a stacked piezo-electric element, wherein the stacked piezo-electric element is arranged for contracting and/or expanding in a direction substantially parallel to the first axis.

9. The apparatus for producing prills according to claim 1, further comprising a biasing mechanism for preloading the reciprocating drive-unit; and wherein the biasing mechanism comprises the coupling mechanism and the one of the hollow body and second body, wherein the coupling mechanism and the one of the hollow body and second body are suspended from the reciprocating drive-unit such that a tensile preload is applied to the reciprocating drive-unit.

10. The apparatus for producing prills according to claim 1, further comprising a shaft-assembly comprising a first and second shaft, wherein the second shaft is arranged between the coupling mechanism and the one of the hollow body and second body and wherein the first shaft is arranged between the rotary drive unit and the other of the hollow body and second body.

11. The apparatus for producing prills according to claim 10, wherein the first and second shafts are arranged coaxially.

12. The apparatus for producing prills according to claim 10, wherein the first shaft is arranged to at least partially enclose the second shaft in the radial direction, or wherein the second shaft is arranged to at least partially enclose the first shaft in the radial direction.

13. The apparatus for producing prills according to claim 10, wherein the shaft-assembly comprises a third bearing system, wherein the third bearing system is arranged between the first and second shafts, the third bearing system comprising at least a linear bearing member, such that the second shaft is arranged to move with respect to the first shaft in the axial direction.

14. The apparatus for producing prills according to claim 1, wherein a rotational transfer mechanism is arranged between the hollow body and second body and wherein the rotational transfer mechanism couples the rotational motion around the first axis of the hollow body and second body.

15. The apparatus for producing prills according to claim 1, wherein the liquid inlet debouches in the second body and wherein the second body comprises at least one through hole for forming a liquid connection between the gap and the liquid inlet.

16. The apparatus for producing prills according to claim 15, wherein a primary through hole runs substantially parallel to the first axis and wherein the primary through hole is arranged to debouche in a lower section of the hollow body.

17. The apparatus for producing prills according to claim 15, wherein secondary through holes, running at least outwardly in the radial direction as seen from the first axis, are arranged in the circumference of the of the second body; and wherein the secondary through holes of the second body and the liquid outlets of the hollow body, as seen along the radial direction, are arranged at a nonzero distance from each other.

18. The apparatus for producing prills according to claim 15, wherein substantially fin shaped members are arranged in the through-hole of the second body.

19. The apparatus for producing prills according to claim 1, wherein the hollow body and second body are hollow conical frustums and wherein the reciprocal drive-unit is arranged for reciprocally varying the width of the gap between the hollow body and second body.

* * * * *